(12) United States Patent
Bugno

(10) Patent No.: US 10,112,283 B2
(45) Date of Patent: Oct. 30, 2018

(54) METHOD FOR CLEANING TANK MELTING FURNACES FOR MAKING GLASS ITEMS

(71) Applicant: FARE S.R.L., Dolo (IT)

(72) Inventor: Riccardo Bugno, Dolo (IT)

(73) Assignee: FARE S.R.L., Dolo (IT)

( * ) Notice: Subject to any disclaimer, the term of this patent is extended or adjusted under 35 U.S.C. 154(b) by 0 days.

(21) Appl. No.: 14/436,348

(22) PCT Filed: Oct. 11, 2013

(86) PCT No.: PCT/EP2013/071333
§ 371 (c)(1),
(2) Date: Apr. 16, 2015

(87) PCT Pub. No.: WO2014/060322
PCT Pub. Date: Apr. 24, 2014

(65) Prior Publication Data
US 2015/0314419 A1    Nov. 5, 2015

(30) Foreign Application Priority Data
Oct. 16, 2012   (IT) ............... PD2012A0300

(51) Int. Cl.
*B08B 9/093*   (2006.01)
*B24C 1/00*   (2006.01)
(Continued)

(52) U.S. Cl.
CPC ............ *B24C 1/00* (2013.01); *B08B 9/093* (2013.01); *B24C 7/0046* (2013.01); *C03B 5/237* (2013.01); *F27D 1/1694* (2013.01); *Y02P 40/535* (2015.11)

(58) Field of Classification Search
None
See application file for complete search history.

(56) References Cited

U.S. PATENT DOCUMENTS

| 2,839,286 A | * | 6/1958 | Poth | ............... C03B 5/237 165/9.3 |
| 3,384,358 A | * | 5/1968 | Morton | ............ C03B 5/237 165/6 |

(Continued)

FOREIGN PATENT DOCUMENTS

| DE | 19543743 A1 | 5/1997 |
| EP | 2312255 A2 | 4/2011 |

(Continued)

OTHER PUBLICATIONS

International Search Report and Written Opinion dated Nov. 15, 2013 issued in PCT/EP2013/071333.

(Continued)

*Primary Examiner* — Mikhail Kornakov
*Assistant Examiner* — Ryan L. Coleman
(74) *Attorney, Agent, or Firm* — Scully, Scott, Murphy & Presser, P.C.

(57) ABSTRACT

A method for cleaning tank melting furnaces for making glass items, provided with a melting chamber, which has a melting tank, to which a regeneration chamber is connected, of the type provided with at least one regenerator comprising a supporting structure for layers of refractory bricks, which are superimposed in a staggered arrangement so as to determine paths for the descent of the cooling exhaust gases that arrive from the melting chamber, the method consisting in sandblasting the exhaust gas descent paths and providing for the insertion of a delivery pipe for the delivery of an abrasive material through openings for access from the outside to the regeneration chamber and gradually into the exhaust gas descent paths.

2 Claims, 3 Drawing Sheets

(51) Int. Cl.
*B24C 7/00* (2006.01)
*C03B 5/237* (2006.01)
*F27D 1/16* (2006.01)

(56) References Cited

U.S. PATENT DOCUMENTS

| | | | |
|---|---|---|---|
| 4,684,616 A * | 8/1987 | Trears | C03B 5/1672 |
| | | | 134/11 |
| 5,081,800 A * | 1/1992 | Ruholl | B08B 9/051 |
| | | | 180/21 |
| 5,137,081 A | 8/1992 | Eskla | |
| 2006/0100342 A1 * | 5/2006 | Jensen | C08K 9/08 |
| | | | 524/492 |

FOREIGN PATENT DOCUMENTS

| | | |
|---|---|---|
| GB | 2 145 213 A | 3/1985 |
| JP | S60-71896 | 4/1985 |
| JP | 4-227486 A | 8/1992 |
| JP | 2000-337622 A | 12/2000 |
| JP | 2004-202485 A | 7/2004 |
| JP | 2007-3035 A | 1/2007 |
| JP | 2010-23035 A | 2/2010 |
| WO | 02/084193 A1 | 10/2002 |
| WO | WO 2007/006293 A1 | 1/2007 |

OTHER PUBLICATIONS

Japanese Notice of Grounds of Rejection dated May 9, 2017 received in Japanese Patent Application No. 2015-537204, together with an English-language translation.
Russian Search Report dated Jul. 13, 2017 received in Russian Patent Application No. 2015117990/03(027953), together with an English-language translation.
Russian Office Action dated Jul. 13, 2017 received in Russian Patent Application No. 2015117990/03(027953), together with an English-language translation.
Japanese Office Action dated May 8, 2018 received in Japanese Patent Application No. 2015-537204.

* cited by examiner

METHOD FOR CLEANING TANK MELTING FURNACES FOR MAKING GLASS ITEMS

FIELD OF THE DISCLOSURE

The present invention relates to a method for cleaning tank melting furnaces for making glass items.

BACKGROUND OF THE DISCLOSURE

As is known, tank melting furnaces are used in factories for the continuous production of glass items.

This type of furnace is constituted substantially by a melting chamber with a tank in which a mixture of components of the glass melts and from which the glass flows out in the liquid state through a neck located on the bottom of the tank in order to reach the processing area, and by a regeneration chamber, in which the exhaust gases that originate from the molten glass tank cool down.

These plants operate according to regenerative thermal cycles, recovering the heat that originates from the melting tank by means of regenerators, constituted by layers of stacked refractory bricks, typically made of magnesite, which are arranged inside the regeneration chamber and are supported by a supporting structure.

It is preferable to use bricks having an octagonal base, arranged in a honeycomb configuration and with staggered layers, so as to define inline vertical paths and articulated paths for the exhaust gases that originate from the tank and which, by cooling, descend toward the lower region of the regeneration chamber by passing through the layers of bricks.

However, bricks of the cross-shaped type or solid bricks are also used and are in any case arranged in staggered side-by-side layers so as to create paths of the described type.

The exhaust gases contain sulfates, which during cooling are deposited on the walls of the bricks.

Over time, due to this deposition, such paths are obviously subject to becoming clogged, forcing to shut down the furnace and therefore to interrupt the production cycle in order to perform cleaning operations.

To avoid the need to resort to furnace shutdown, currently preference is given to a method for cleaning the paths of the regenerator which provides for the ignition of methane gas burners at the base of the regenerators. The increase in temperature inside the regenerators melts the sulfates and accordingly makes them fall onto the bottom of the regeneration chamber, which is cleaned by an operator assigned to maintenance of the plant, working in the lower part of the chamber below the supporting structure for the layers of bricks.

This method is not devoid of drawbacks.

The foremost is the fact that the operator must work inside the regeneration chamber, in the lower part, exposing himself to extremely high temperatures, typically comprised between 450 and 650° C.

Moreover, this method causes wear of the lowest layers of bricks (proximate to which the burners are located), which, brought to operating conditions that are at the limit of their thermal and mechanical strength, are spoiled and crushed until they cause collapses of the stack and failure of the surface on which they rest.

Another drawback is linked to the fact that during this scrubbing process the furnace operates in pressure conditions that are higher than the design operating pressure.

The aim of the present invention is to devise a method for cleaning tank melting furnaces that is capable of solving the observed drawbacks.

Within this aim, an object of the invention is to prevent the operators assigned to maintenance of the plant from being forced to work in high temperature conditions.

Another object of the invention is to devise a cleaning method that is not harmful for the structure of the regeneration chamber.

A further object of the invention is to clean the regenerator without having to modify for this purpose the operating conditions of the furnace.

SUMMARY OF THE DISCLOSURE

This aim, as well as these and other objects that will become better apparent hereinafter, are achieved by a method for cleaning tank melting furnaces for making glass items, provided with a melting chamber, which has a melting tank, to which a regeneration chamber is connected, of the type provided with at least one regenerator that comprises a supporting structure for layers of refractory bricks, which are superimposed in a staggered arrangement so as to determine paths for the descent of the cooling exhaust gases that arrive from said melting chamber, said method consisting in sandblasting said exhaust gas descent paths and providing for the insertion of a pipe for the delivery of an abrasive material through openings for access from the outside to the regeneration chamber and gradually into said exhaust gas descent paths.

BRIEF DESCRIPTION OF THE DRAWINGS

Further characteristics and advantages of the invention will become better apparent from the description of a preferred not exclusive embodiment of the method according to the invention, illustrated by way of nonlimiting example in the accompanying drawings, wherein.

DETAILED DESCRIPTION OF THE DISCLOSURE

Figure 1:
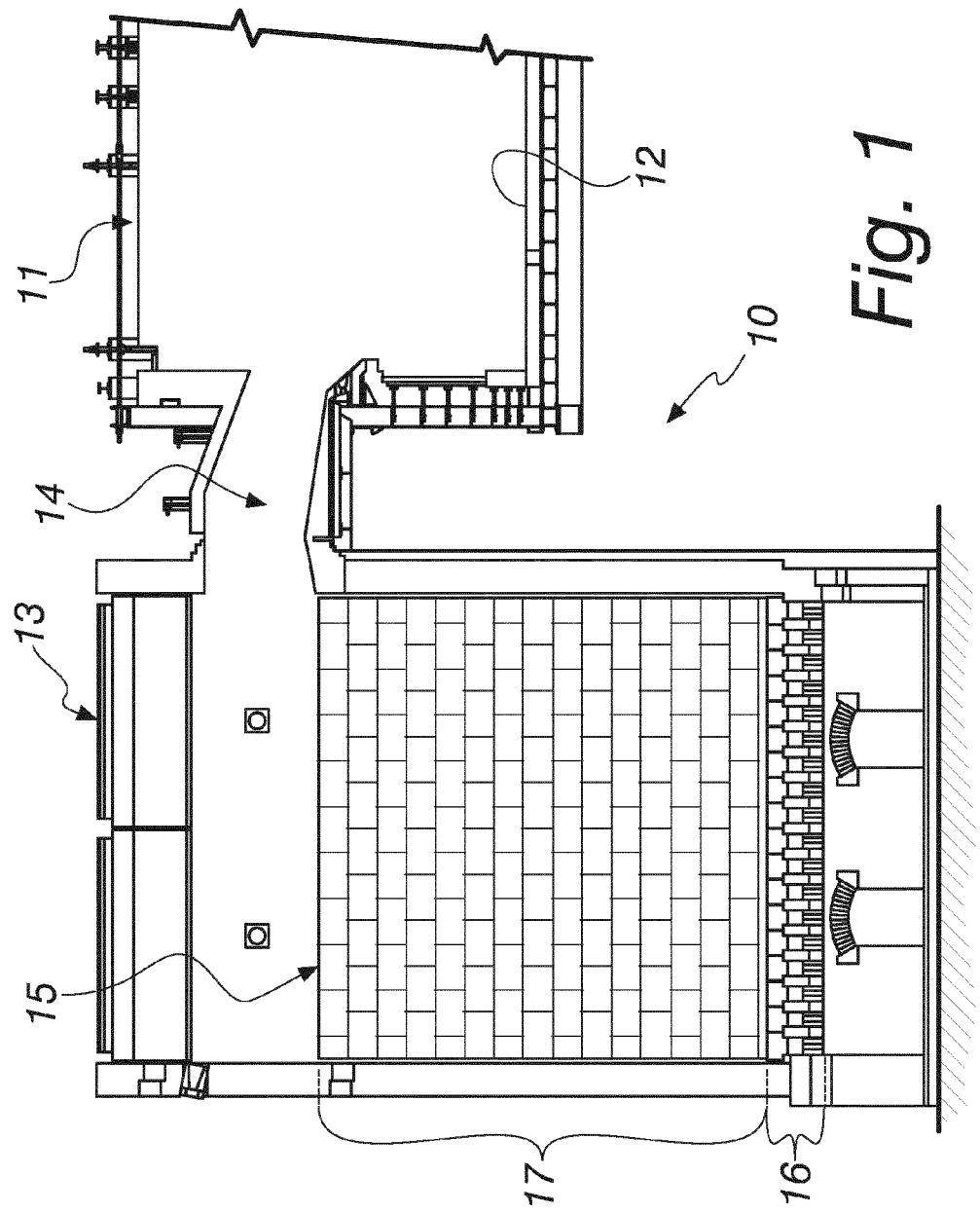
FIG. 1 is a schematic view of the tank melting furnace.

With reference to the figures, the method according to the invention is studied for tank melting furnaces 10, which are provided with a melting chamber 11, provided with a melting tank 12, to which a regeneration chamber 13 is connected by means of a bridge-like connecting neck 14 between them, as can be seen in FIG. 1.

The regeneration chamber 13 is of the type that has a regenerator 15 that comprises a supporting structure 16 for layers of refractory bricks 17, which are superimposed in a staggered manner so as to produce descent paths 18a and 18b for the cooling exhaust gases that originate from the melting chamber 11 and reach the regeneration chamber 13 by passing through the connecting neck 14.

Figure 3:
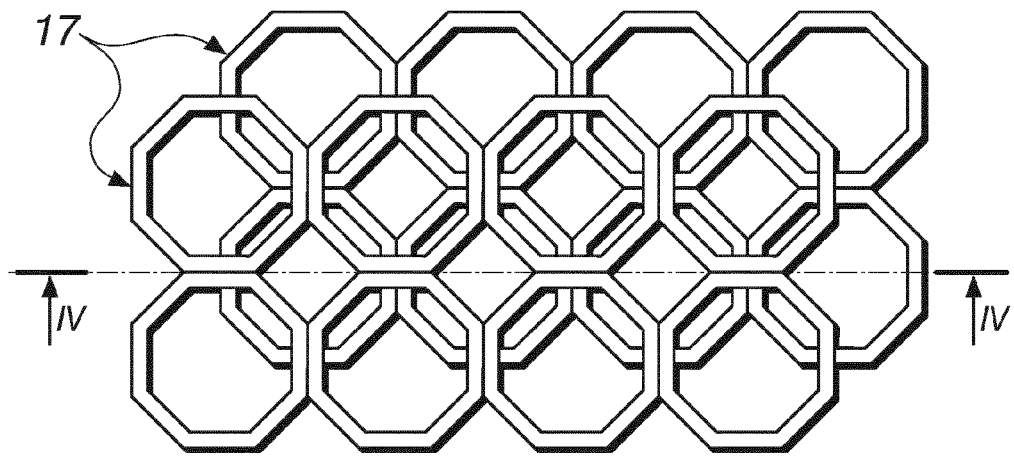
FIG. 3 is a top view of a pair of layers of superimposed bricks.
Figure 4:
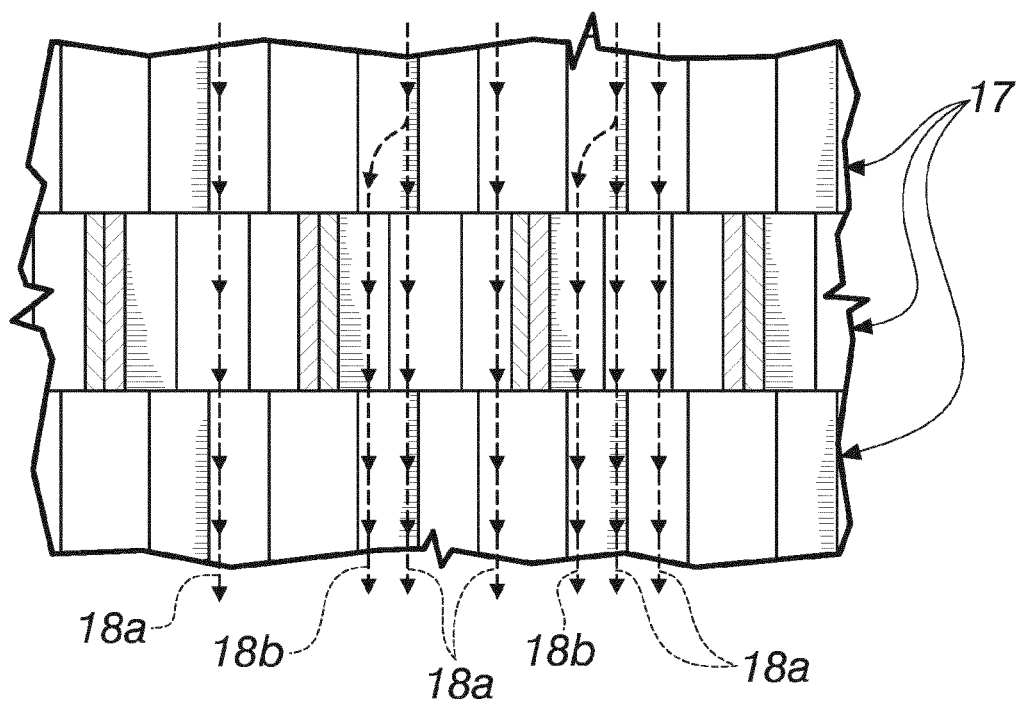
FIG. 4 is a sectional view of three layers of bricks, through which the exhaust gas descent paths are created.

The exhaust gas paths 18a and 18b are shown in FIG. 4, while the bricks often are of the type with an octagonal base of the kind shown in FIG. 3, which shows the way in which they are arranged in staggered layers 17.

In this manner, they determine the descent paths of the exhaust gases, which can be of the vertical in-line type 18a or articulated paths 18b, as indicated in FIG. 4.

The above cited FIGS. 3 and 4 illustrate respectively two and three layers of bricks 17; however, the regenerator 15 can comprise many more, depending on the design requirements.

The described example shows bricks having an octagonal base; however, they can be of the cross-shaped or solid type, in any case arranged in staggered layers and side by side so as to create paths of the described type.

The cleaning method according to the invention consists in sandblasting the exhaust gas descent paths 18a and 18b by using a sandblasting machine 19.

The sandblasting machine 19 is provided conveniently with a reservoir 20, with a compressed air generator 21 and with a delivery pipe 22 for an abrasive material. In particular, in the described method the delivery pipe 22 is supplied with compressed air with quartz dust, to clean the descent paths of the exhaust gases 18a and 18b from the substances, such as sulfates, that deposit on their walls.

The method consists in sandblasting the exhaust gas descent paths 18a and 18b and provides for the insertion of the delivery pipe 22 through openings for access from outside 23, 23a to the regeneration chamber and gradually into the exhaust gas descent paths 18a, 18b.

The method provides for cleaning starting from below of the regenerator 15 or, in an equivalent manner, from above.

In the first case, sandblasting provides for the insertion of the delivery pipe 22, passing in succession through the openings for access from the outside 23 (arranged in the lower part of the regeneration chamber 13) and through vertical openings 24 of the supporting structure 16, in order to move it from the base of the regenerator 15 into the exhaust gas descent paths 18a and 18b.

In the second case, the same sandblasting operation provides, in an equivalent and alternative manner, the insertion of the delivery pipe 22 through openings for access from the outside 23a provided proximate to the top of the regeneration chamber 13, to move it from the upper region of the regenerator 15 into the exhaust gas descent paths 18a, 18b.

This operation can be performed both from the upper part and from the lower part of the regenerator 15, according to the requirements.

Figure 2:
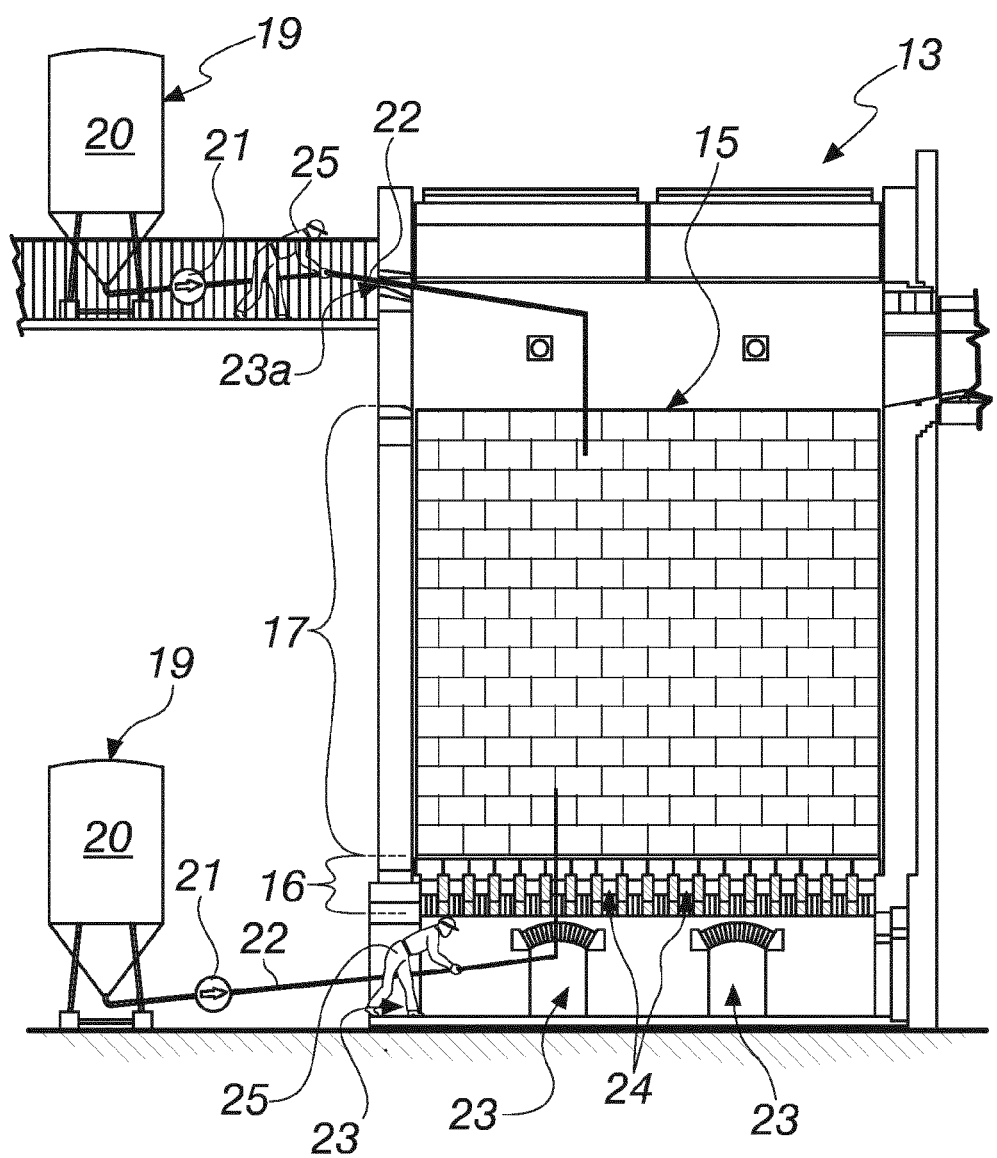
FIG. 2 is a schematic view of the regeneration chamber during the cleaning of the regenerator from above and from below.

In particular, as shown in FIG. 2, in order to clean the layers of bricks 17 starting from the lower part of the regenerator 15, the operator 25 places himself proximate to the opening for access from the outside 23, from which, finding the free space below the supporting structure 16, he is able to insert the delivery pipe 22 through the vertical openings 24 into the exhaust gas descent paths 18a.

Continuing with the operation, the operator 25 causes the delivery pipe 22 to pass in each one of the vertical openings 24, inserting it each time gradually along an exhaust gas descent path 18a that is vertical and in-line and at most for a first extent of the articulated paths 18b.

Although the delivery pipe 22 does not follow also the more complex shapes of the articulated exhaust gas descent paths 18b and cannot reach in terms of length the farthest regions to be cleaned, the use of the sandblasting machine 19, which in this case operates by being supplied with compressed air with pressure levels that reach the order of 10 bar, allows to clean even spaces that are not in the direct vicinity of the nozzle of the delivery pipe 22.

As regards the cleaning of the regenerator 15 starting from the upper region of the layers of bricks 17, the operator 25, again as shown in FIG. 2, inserts the delivery pipe 22 through an opening for access from the outside 23a into the regeneration chamber 13, remaining always completely outside the furnace, from which he can move the delivery pipe 22, inserting it in the regenerator 15 each time from a different point of the surface and gradually deeper along an exhaust gas descent path 18a. In a manner similar to what has been described for the insertion of the delivery pipe 22 from below, the use of the sandblasting machine 19 allows to clean also the regions that are not in the direct vicinity of the nozzle of the pipe.

Advantageously, the delivery pipe 22 can be contained in another pipe that is cooled with air or water to work at the high temperatures of the regeneration chamber 13. Moreover, the delivery pipe 22 can be calibrated and inclined appropriately according to the requirements and can be accompanied by one or more video cameras, which are also cooled with air or water.

The video cameras are provided with a monitor for real-time monitoring of the cleaning process and for the optional recording and capture of photographs of the work being performed.

It should be noted that the proposed method allows to clean the regenerator 15 without interrupting or reducing the production activity of the furnace.

In fact, by way of the method according to the invention, during cleaning the melting furnace 10 can operate according to the operating parameters set by factory personnel.

Moreover, the bricks that constitute the layers of the regenerator 15 are not subjected to any thermal shock, thus excluding the danger of breaking and crushing and, in the worst cases, of collapses of the stack and of the supporting structure 16 on which they rest.

It should also be noted that the operator 25 assigned to the maintenance of the tank melting furnace 10 remains outside the regeneration chambers 13, avoiding exposure to high temperatures.

In practice it has been found that the invention achieves the intended aim and objects, proposing a method for cleaning melting furnaces, particularly regenerators of the regeneration chamber, that are capable of solving the observed drawbacks, preventing the operators from working in high temperature conditions, without causing damage to the structure and without having to interrupt or slow the production cycle of the plant.

Another advantage arises from the fact that the sandblasting operation uses abrasive material that contains components that are compatible with molten glass; in this way, if some of them rise into the melting chamber, they dissolve and mix with the molten glass, without causing the presence of inclusions or air bubbles in the finished product.

A further advantage resides in that the sandblasting operation as described, by allowing the operator to clean the regenerator while working fully from the outside of the regeneration chamber, renders this work exempt from the application of regulations related to confined spaces.

The invention thus conceived is susceptible of numerous modifications and variations, all of which are within the scope of the appended claims; all the details may further be replaced with other technically equivalent elements.

In practice, the materials used, so long as they are compatible with the specific use, as well as the contingent shapes and dimensions, may be any according to requirements and to the state of the art.

The disclosures in Italian Patent Application No. PD2012A000300 from which this application claims priority are incorporated herein by reference.

The invention claimed is:

1. A method for cleaning a regenerator of a tank melting furnace for making glass items, wherein the tank melting furnace comprises a melting chamber, which has a melting tank to which a regeneration chamber is connected, wherein the regeneration chamber comprises a regenerator comprising a supporting structure for layers of refractory bricks, which are superimposed in a staggered arrangement so as to determine descent paths for the descent of the cooling exhaust gases that arrive from said melting chamber, said cleaning method comprising sandblasting said exhaust gas descent paths during operation of the melting furnace, wherein said sandblasting comprises inserting a sandblasting delivery pipe successively through openings of the regeneration chamber and into the exhaust paths from either a base or a top of the regenerator, wherein the sandblasting delivery pipe is supplied with a mixture of compressed gas and abrasive material, and wherein the delivery pipe is contained in a second pipe that is cooled with air or water while the sandblasting is being performed.

2. The method according to claim 1, wherein said delivery pipe is supplied with compressed air and quartz dust.

* * * * *